Dec. 10, 1929.     G. CONSTANTINESCO     1,738,692
UNIDIRECTIONAL DRIVING DEVICE
Filed July 23, 1924     9 Sheets-Sheet 1

Inventor
G. Constantinesco
by
Atty

Dec. 10, 1929.  G. CONSTANTINESCO  1,738,692
UNIDIRECTIONAL DRIVING DEVICE
Filed July 23, 1924  9 Sheets-Sheet 5

Inventor
G. Constantinesco
by [signature]
Atty

Dec. 10, 1929.  G. CONSTANTINESCO  1,738,692
UNIDIRECTIONAL DRIVING DEVICE
Filed July 23, 1924  9 Sheets-Sheet 6

Inventor
G. Constantinesco
by [signature]
Atty

Dec. 10, 1929.  G. CONSTANTINESCO  1,738,692
UNIDIRECTIONAL DRIVING DEVICE
Filed July 23, 1924   9 Sheets-Sheet 7

Fig. 10.a

Inventor
G. Constantinesco

Dec. 10, 1929.    G. CONSTANTINESCO    1,738,692
UNIDIRECTIONAL DRIVING DEVICE
Filed July 23, 1924    9 Sheets-Sheet 8

Inventor
G. Constantinesco
by [signature]
Atty.

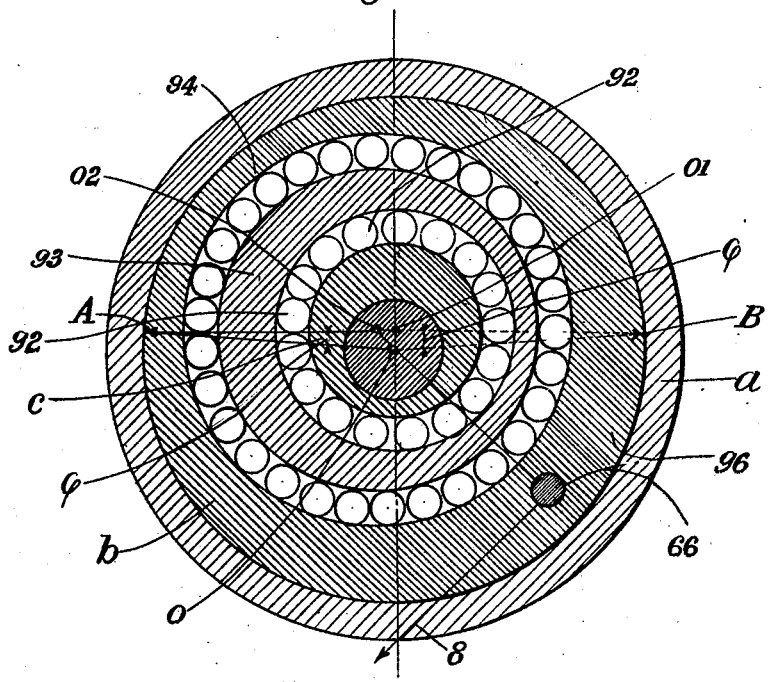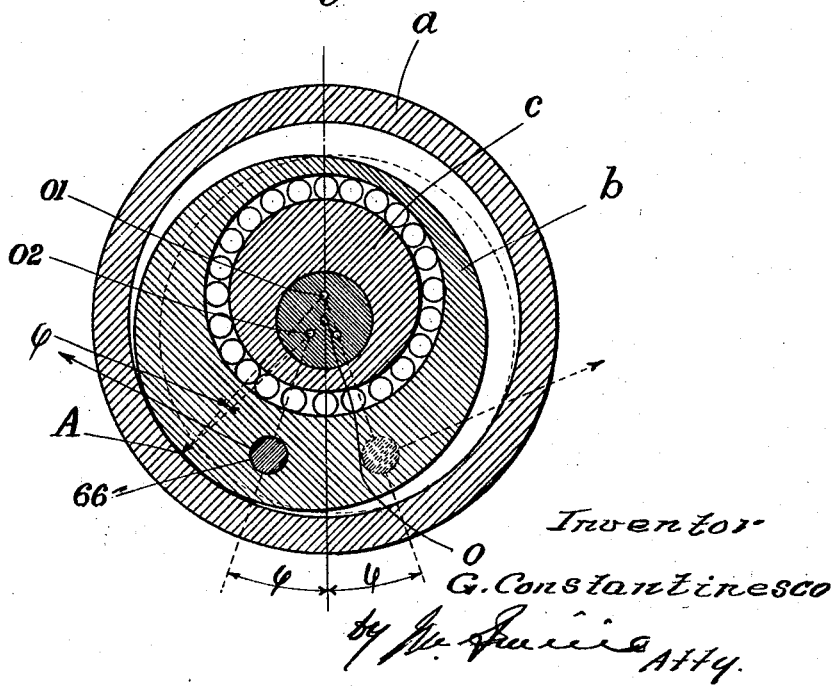

Patented Dec. 10, 1929

1,738,692

UNITED STATES PATENT OFFICE

GEORGE CONSTANTINESCO, OF WEYBRIDGE, ENGLAND

UNIDIRECTIONAL DRIVING DEVICE

Application filed July 23, 1924, Serial No. 727,774, and in Great Britain August 22, 1923.

The present invention relates to unidirectional driving devices of the type in which a gripping member is provided between an oscillator and a rotor, the drive being transmitted by friction between the gripper and the rotor.

In such apparatus as commonly employed, locking readily occurs during the driving stroke of the oscillator but considerable force may be required to disengage the gripper on the return stroke, and such apparatus, unless constructed on correct principles, is entirely unsuitable if the oscillator moves at a comparatively high frequency, as in such cases the release on the return stroke will either not take place, or will take place too late.

I have found that it is necessary that relative movement provided by elastic means should be possible during the driving stroke between the oscillator and the rotor, which movement may be obtained by the elastic give of balls, rollers or other elastic bodies, situated between the oscillator and the gripper, and also between the oscillator and rotor, the oscillator and gripper having eccentric surfaces or their equivalent. Such relative movement may be quite considerable under heavy load. It may amount to as much as 45° of angle or more, in special cases, depending on the value of the eccentricity in proportion to the diameter of the circle of the gripper. On the other hand, if the load is small, such movement will be small too.

According to one feature of the present invention, the apparatus is so constructed that the friction between the gripper and the rotor is considerably greater than the friction between the oscillator and the gripper, and is also so constructed that at the commencment of the driving stroke of the oscillator, movement through a substantial angle is possible between the oscillator and the gripper, owing to the elastic give of balls, rollers or other elastic bodies. At the end of the driving stroke, the balls, rollers or other elastic bodies regain their original forms, and so return the oscillator and gripper to their original positions relatively to one another, thereby disengaging the gripper.

It may be observed that the amount of relative movement under a given load depends upon the degree of eccentricity and elasticity of the balls or other elastic bodies. Under a varying load, it depends upon this load, being greater or less according as the load is greater or less. It is therefore possible so to design the parts that when the reaction of the rotor reaches a given maximum, no movement is imparted to the rotor by the gripper.

Preferably the balls or rollers are free to rotate and also to circulate around their tracks with only a pure rolling motion.

The ball or roller bearings may be provided with floating rings which may be loose or driven by the rotor.

In one form of construction an annular gripper is loosely mounted eccentrically on the oscillator whose axis of oscillation is coaxial with the rotor, elastic bodies being interposed between the oscillator and the rotor; the outer circumference of the gripper is coaxial with the inner surface of the rotor, and means such as a spring is provided, tending to turn the gripper in one direction or the other, according to the direction of rotation desired, or to hold the gripper in its neutral position.

Means may be provided to vary this spring or other controlling force acting on the gripper so that the travel of this latter under inertia forces is varied, whereby the period of gripping during the driving stroke of the oscillator is varied with the result that variable speed and torque on the rotor is obtained.

In a modification I interpose between the gripper and the oscillator and between the oscillator and rotor, curved bars or corrugated sections or rings, immersed in oil, which are so arranged that they bend under load, whereby breaking of the oil film is avoided, and also provide the necessary elasticity required to produce angular motion between the gripper and the oscillator and between the oscillator and the rotor.

In another form of construction the oscillator and rotor are mounted coaxially with a gripper between them, ball or other elastic anti-friction thrust bearings being provided between the oscillator and rotor and between the oscillator and gripper, while a plain face of high bearing friction is provided between the gripper and the rotor, the surfaces of the oscillator and gripper, which co-operate, being inclined to the transverse plane through the apparatus at an angle less than the angle of friction between the gripper and oscillator.

In apparatus constructed as above described, a variable torque can be obtained from a constant speed engine owing to the elasticity of the parts.

In a device driven by mechanism as above described, if the resisting torque increases, the speed of the driven shaft automatically decreases.

The invention also consists in the improved unidirectional driving devices hereinbefore described.

Referring to the accompanying drawings:—

Figure 3:
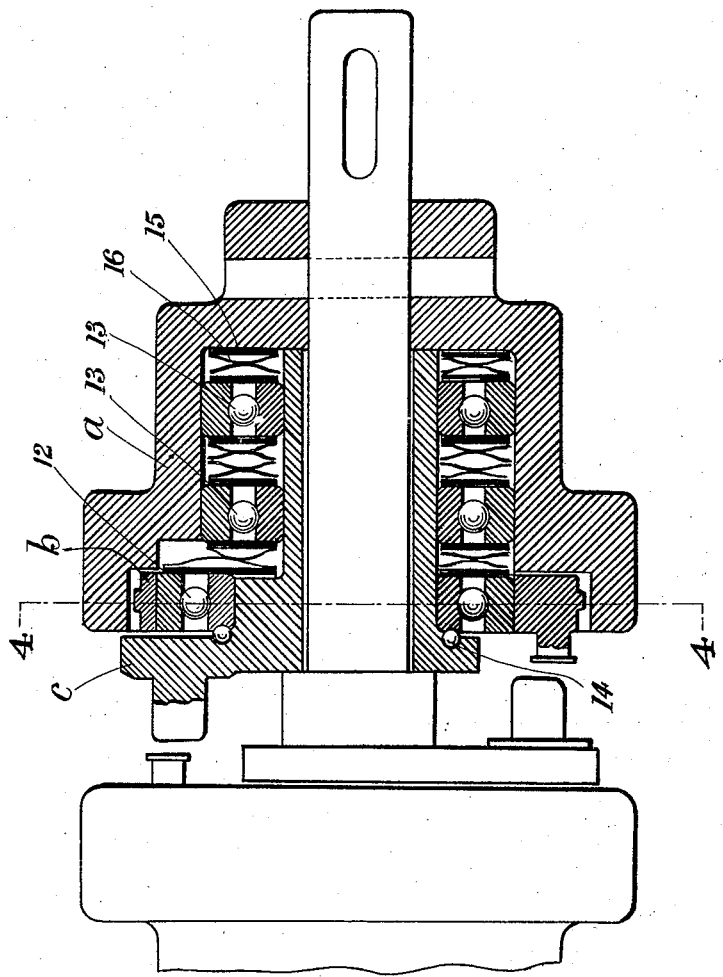
Figure 3 is a longitudinal section.
Figure 4:
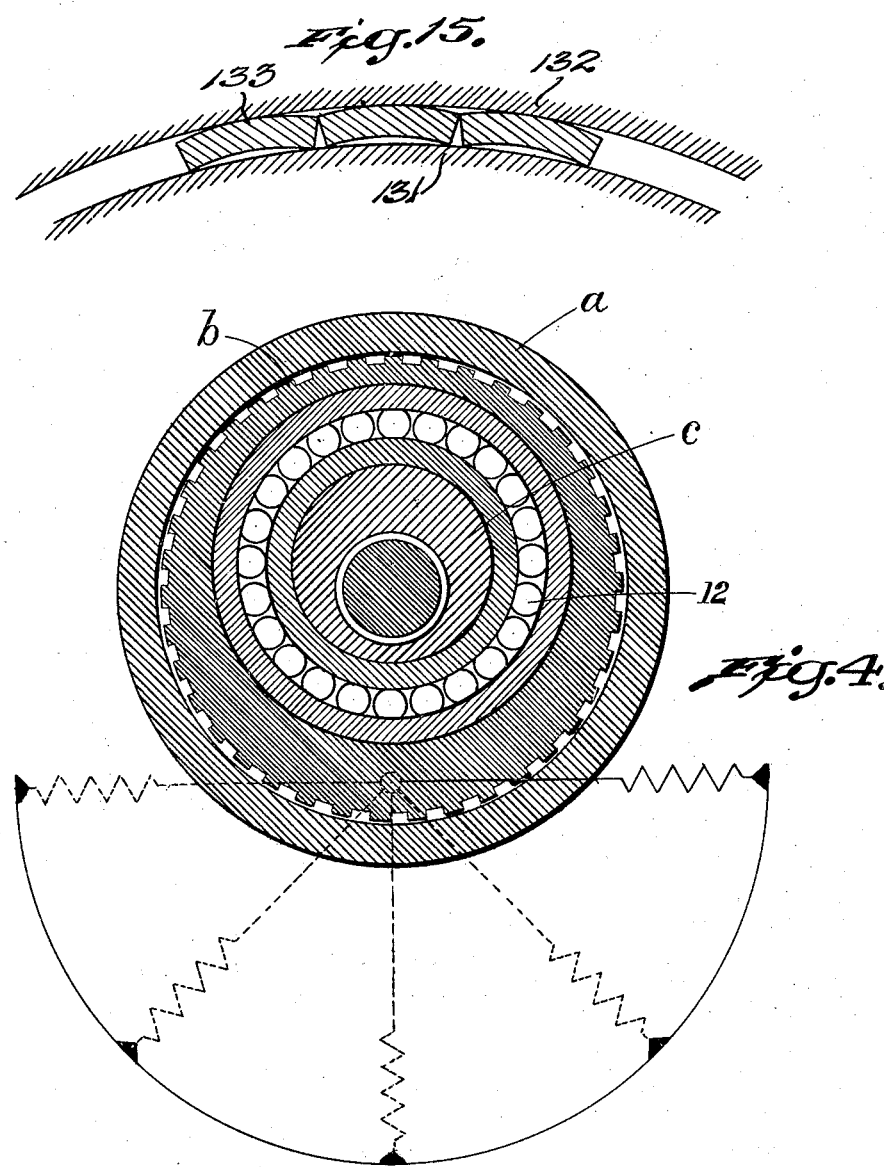
Figure 5:
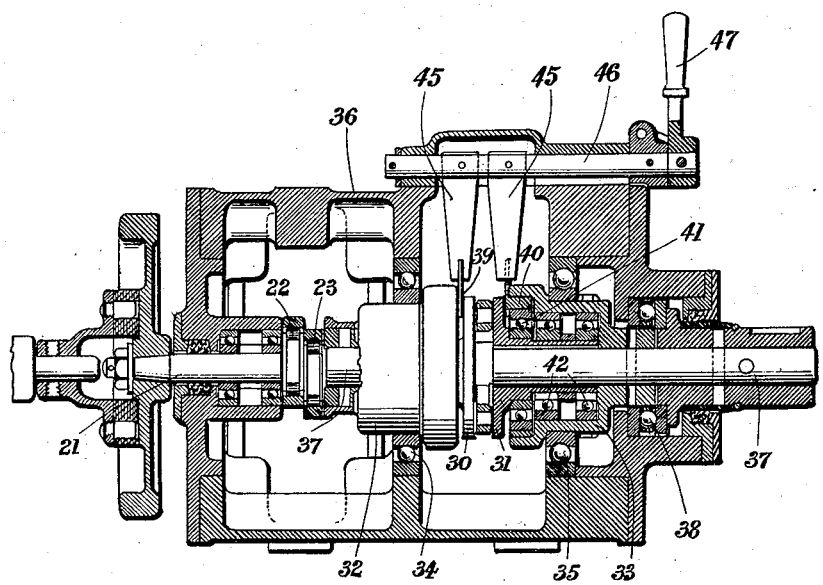
Figure 6:
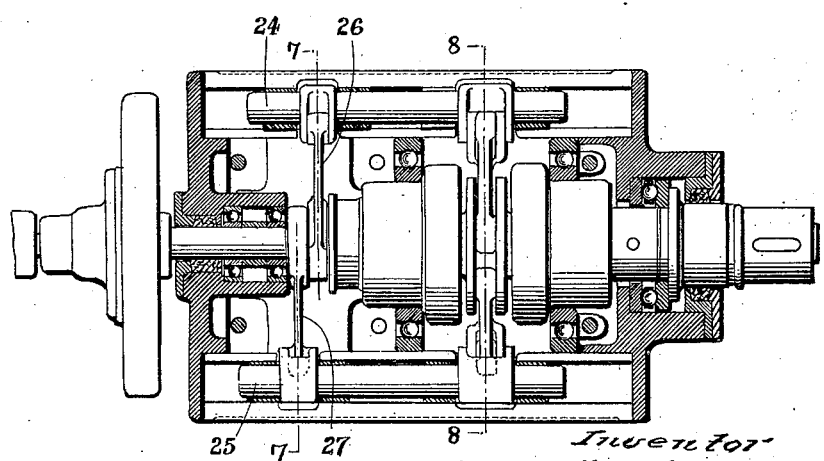
Figure 7:
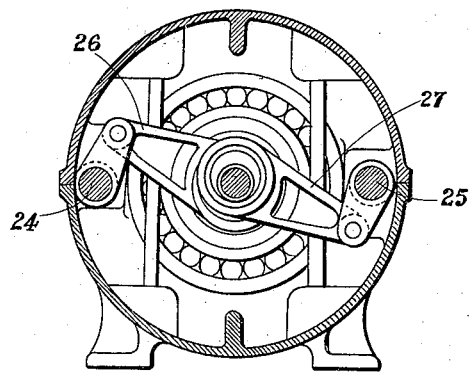

Figure 4 a transverse section on the line 4—4, Figure 3, of a form in which the ball races are caused to rotate by a frictional means;

Figure 5 is a sectional side elevation of a complete double driving device;

Figure 6 is a sectional plan;

Figure 7 is a section on the line 7—7, Figure 6, while

Figure 8:
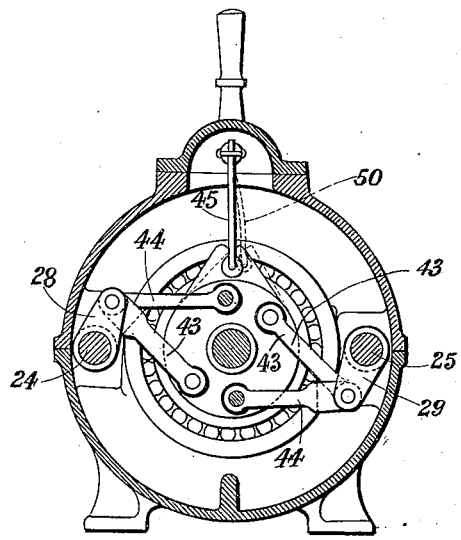
Figure 9:
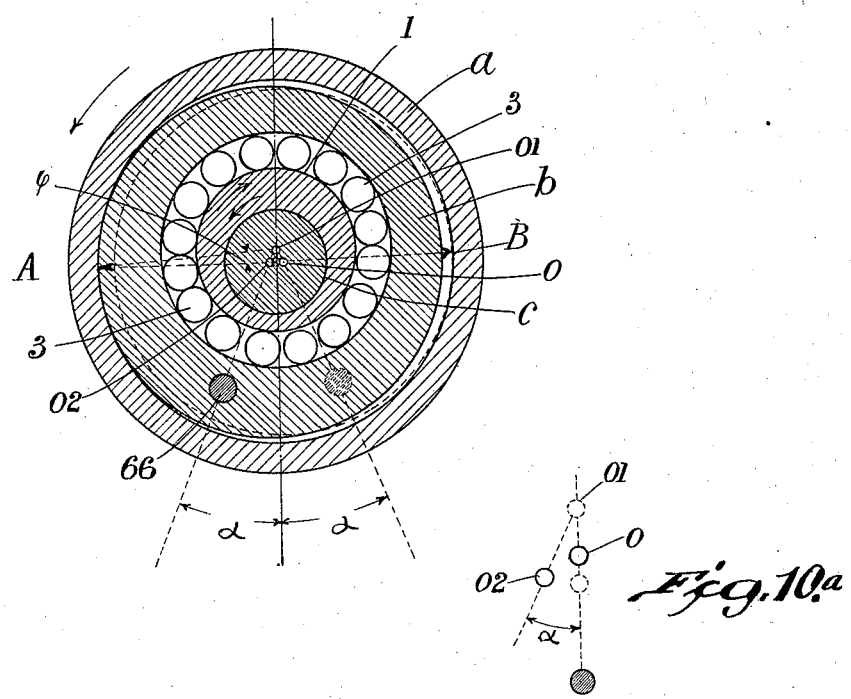
Figure 10:
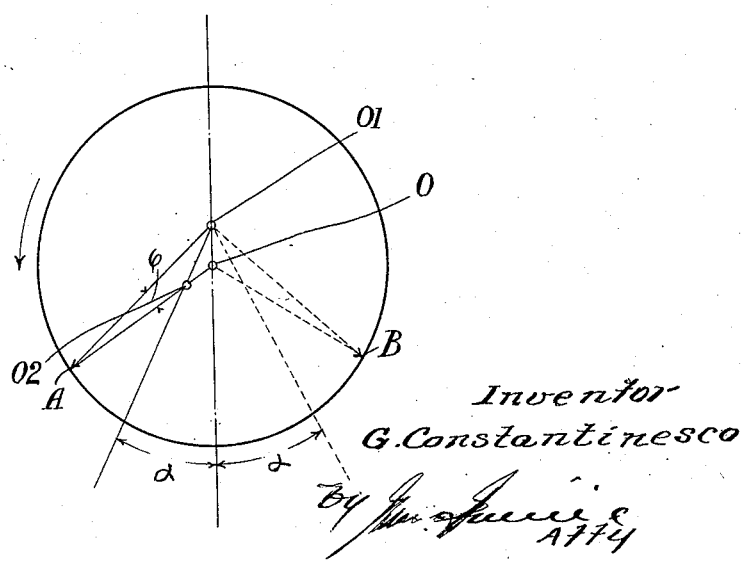

Figure 8 is a part section on the line 8—8, Figure 6;

Figure 9 is a diagrammatic section showing a simple type of driving device with the oscillator inside illustrating the principle of the invention;

Figure 10 is a diagram showing the various centers in a slightly modified arrangement;

Figure 10$^a$ is a diagram on an enlarged scale illustrating the displacement of the centers of the parts during operation.

Figure 11:
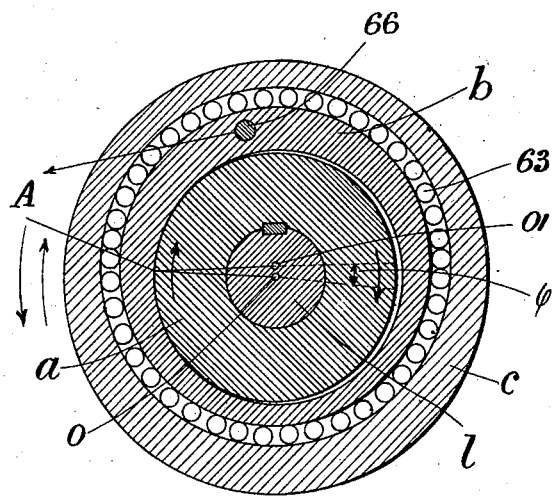
Figure 12:
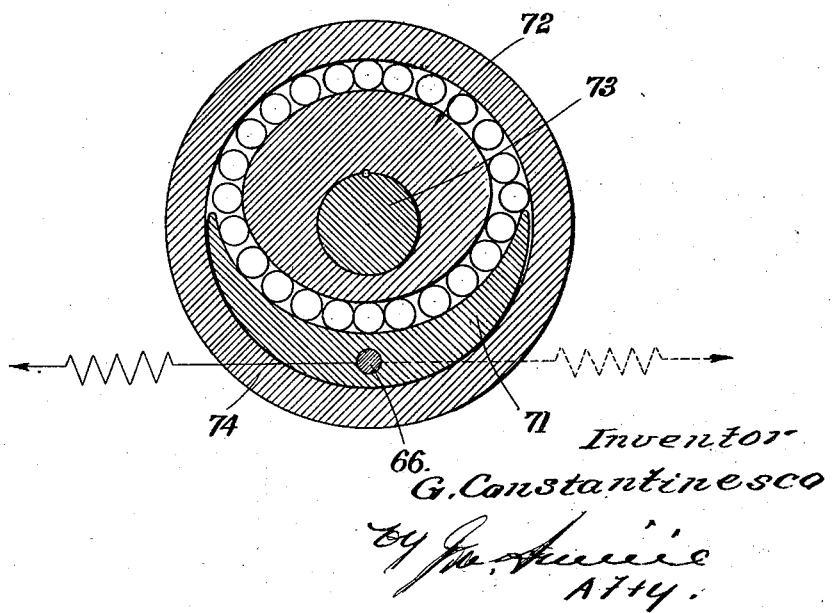

Figure 11 is a diagram showing a simple type of valve with the oscillator outside;

Figure 12 shows a type of driving device in which the gripper is an incomplete ring arranged so that the rollers or balls can circulate around their track;

Figure 13 shows a modified driving device in which two eccentrics are employed;

Figure 14 shows a modification in which the outer circle of the gripper is not concentric with the rotor;

Figure 15 shows a modification in which the radial movement necessary to allow the angular motion is obtained by the use of curved sliding members with an oil film between them and the oscillator;

Figure 16 shows a modified form of the apparatus working on the same principle.

Figure 1:
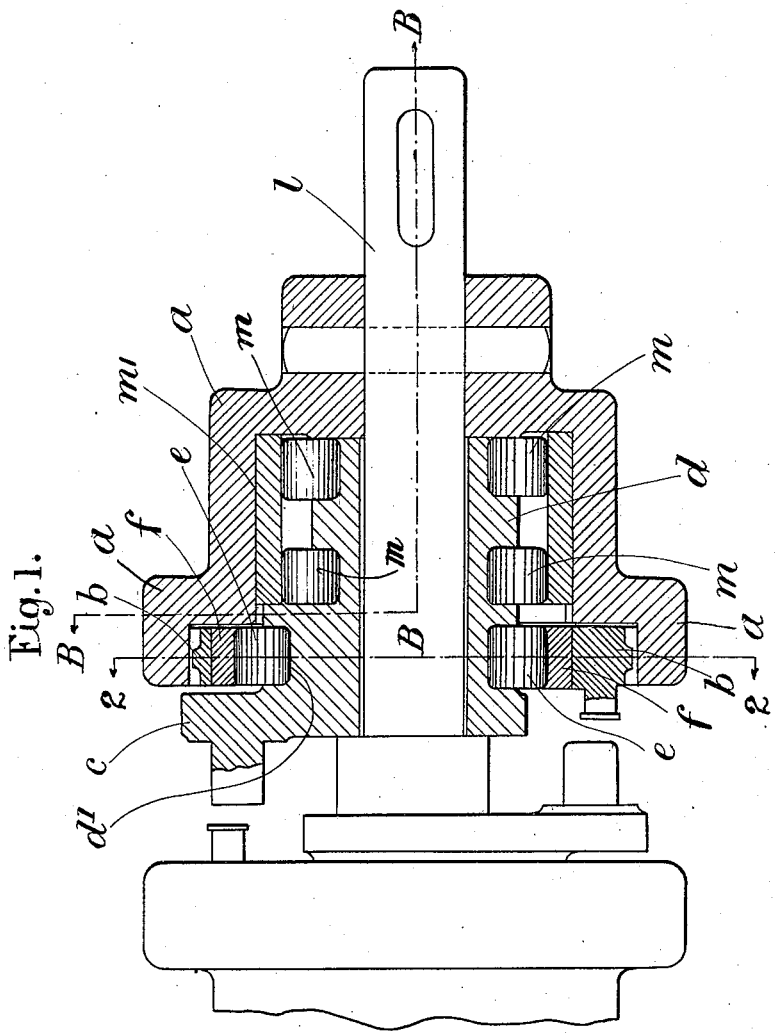
Figure 1 is an elevation partly in section.
Figure 2:
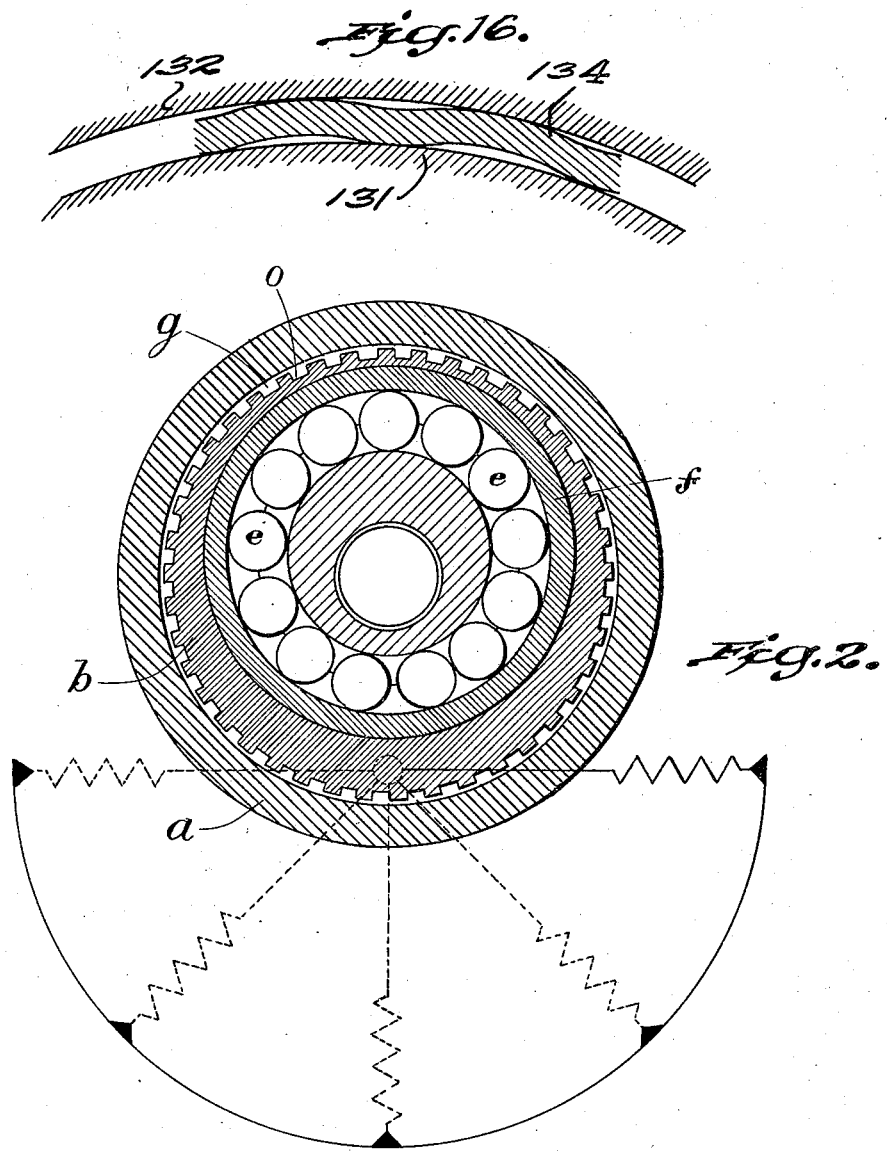
Figure 2 is a transverse section on the line 2—2, Figure 1, of a unidirectional driving device constructed according to the invention.

In carrying the invention into effect as illustrated at Figures 1 and 2, and referring to the right hand half of Figure 1, the rotor $a$ surrounds the gripper $b$ and the oscillator $c$ is in the form of a hollow shaft $d$ on which the eccentric $d^1$ is formed. A ball or roller race $e$ is provided outside the eccentric and the gripper fits freely on the outer member $f$ of the ball race. The external circumference of the gripper is concentric with the rotor when in the neutral position and a small clearance as shown at $g$, Figure 2, is provided between the gripper $b$ and the rotor $a$ which surrounds it. A force acting towards an external point is applied by a spring such as $h$, means being provided to reverse the direction of this force or to hold the gripper in the mean position or to attach it to fixed points in intermediate positions as shown, so as to adjust the initial position of the gripper at the commencement of each stroke of the oscillator. The force in the forward or reverse direction acts on the gripper in the direction opposite to that in which rotation is required to take place, as described in Letters Patent No. 1,617,010 issued to me February 8, 1927. The rotor $a$ comprises a member keyed to a shaft $l$ passing through and floating clear of the hollow shaft $d$ of the oscillator, while between the rotor and the hollow shaft of the oscillator, as shown in Figure 1, roller bearings $m$ may be provided between the concentric part of the shaft or sleeve $d$ and the inner surface of the rotor $a$, so that the friction between the gripper and the rotor is very much greater than the friction between the oscillator and the gripper or the friction between the rotor and the oscillator. $m^1$ represents the outer member of a roller race, corresponding to $f$. To increase the friction the outer surface of the gripper $b$ or preferably the inner surface of the rotor $a$ is cut away as shown at O so as to obtain very high pressure per square inch between the gripper and the rotor and thus ensure the breaking of the oil film and consequent high friction. The left hand side of the apparatus partly shown in elevation is similarly constructed, the oscillator and gripper driving the rotor in the same direction as the corresponding parts on the right hand side, but operating at a phase difference of 180 degrees as shown further in Figures 5-8.

With such an arrangement if $\epsilon$ is the radius of eccentricity, R the internal radius of the rotor where the gripper acts, F the external force exerted against the rotor in the radial direction, and $F_1$ the force acting on the rotor in the circumferential direction $F_1R=F\epsilon$; and if $\varphi$ is the angle of friction, gripping between the gripper and the rotor will take place if $\dfrac{F_1}{F}$, which is equal to $\dfrac{\epsilon}{R}$, is less than $\varphi$. An angle $\varphi$ of 5 per cent is a practical figure if the gripper and rotor are hard steel surfaces, cut away as shown, the pressure per square inch being as high as possible without injury to the metal. Such local pressures may be as high as 10 to 100 tons per square inch for very hard surfaces. The above quantities will be better understood by reference to Figure 9. $\epsilon$ is the distance $o\ o'$ and R is the distance from $o$ to the inner surface of the rotor.

It will be seen that this apparatus can be made reversible by merely reversing the direction of action of the controlling force exerted by the spring $h$, Fig. 2.

In the form of the invention shown in Figures 3 and 4, which is very similar to that shown in Figures 1 and 2, ball bearings 12 are provided between the oscillator and the gripper $b$ and ball bearings 13 are provided between the oscillator $c$ and the rotor $a$. Small ball bearings 14 are provided between the inner race of the ball bearing 12 and the oscillator and friction pads 15 and springs 16 are employed to give a frictional contact between the races and the rotor so that during the idle period there is a tendency for these races to be carried round by the rotor.

A further example of the invention is shown in Figures 5, 6, 7 and 8, which shows the device duplicated. The primary shaft 21 carries a pair of eccentrics 22, 23, 180 degrees apart which oscillate a pair of intermediary shafts 24, 25 by means of straps 26, 27. The shafts 24, 25 carry cranks 28, 29 which actuate a pair of oscillating members 30, 31 mounted within hollow rotors 32, 33. The rotors are supported within ball bearings 34, 35 mounted in the casing 36 of the machine and are keyed to the secondary shaft 37. Between the oscillators 30, 31 and the rotors 32, 33, there are provided grippers, one of which is shown at 40 with ball races 41 between them and the oscillators. Ball races 42 are also provided between the oscillators and the rotors.

In this form of the invention each oscillator is driven by a pair of connecting rods 43 at opposite ends of a diameter, one oscillator being driven by the connecting rods 43 and the other by the connecting rods 44. The grippers are acted on by a controlling force in one direction or the other or kept in the mean position by springs 45 mounted on a shaft 46 which can be turned about its axis by the handle 47 to exert pressure as shown by the dotted lines 50, Figure 8, or in the opposite direction or to hold the springs 45 in the mean position as required. In the mean position the secondary shaft is free. The springs 45 may be fixed in intermediate positions, by which means the travel of the gripper and therefore the period of gripping can be varied with the result of changing the motion of the rotor while the stroke of the oscillator remains uniform.

The method of operation of the driving devices is illustrated at Figures 9 to 14.

Referring to Figure 9, the oscillator $c$ oscillates about the centre $o$ and is provided with an eccentric circular cam 1 whose centre is at $o_1$; between the eccentric 1 and the annular gripper $b$, there is provided a row of rollers 3; a definite clearance is allowed between the outer circumference of the gripper and the inner circumference of the cylindrical rotor $a$. When the gripper is at its mean position and the rotor is free to rotate in either direction, the centres of the circular cam 1, gripper and rotors are all three in a straight line. When the gripper is moved by an external force through an angle $\alpha$ to the position shown in full lines, its centre moves to the point $O_2$ and gripping between the gripper and rotor takes place along a line parallel to the axis through the point A at which the line $OO_2$ strikes the rotor. The angle $OAO_1$ must be less than the angle of friction between rotor and gripper. In this position when the oscillator moves in the anti-clockwise direction after gripping takes place at A, there is an angular movement of the oscillator in advance of the movement of the rotor and gripper which are moved together owing to the slight movement allowed by the elasticity of the balls or bearing surfaces.

The existence of this movement is essential to the release when the motion of the oscillator is reversed as it allows a rolling movement to take place on the rollers or on the frictionless bearings on the oil film between the oscillator and the gripper and simultaneously with a similar action on the bearings between the oscillator and the rotor not shown in Figure 9, but shown in Figure 5 at 42. Further it will be seen that during the idle stroke of the oscillator the rollers or the like circulate around their track so that fresh and different lines of contact are subjected to stress at successive periods of engagement.

It will be noticed that at the moment of gripping, the centres $o$, $o_1$, $o_2$ are at the angles of a small triangle owing to the movement from the mean position of the centre of the slider allowed by the clearance between the gripper and rotor and by the virtual motion during gripping.

When the gripper is moved to the dotted line position, the drive takes place in the opposite direction, the contact pressure being transferred to the point B instead of A.

Also it will be seen that a number of adjacent rollers or the like take the stress at each engagement.

A similar arrangement is shown in Figure 10, but in this case the eccentricity is greater and the triangle formed by the points $o$, $o_1$, $o_2$ has a more obtuse angle than in Figure 16 and the pressure or gripping and angle of friction are higher. It is, however, necessary in order to avoid excessive stresses that the angle $o_1 o o_2$ should not be too great.

Figure 11 is a diagram showing a simple type of driving device in which an external oscillator is employed. The oscillator $c$ being suitably supported by anti-friction bearings, not shown in the figures, moves about the axis $o$. Between the inner circumference and the oscillator whose centre is at $o_1$ and the outer circumference of the gripper $b$, there is provided a row of rollers 63. The rotor 64 is keyed to the secondary shaft $l$ and a slight clearance is allowed between the circumference of the rotor and the inner circumference of the gripper. With the gripper and the oscillator in the position shown, the point of gripping is at A and the direction of drive is shown by the arrows marked on the rotor. The angle of friction $\phi$ is the angle $oAo_1$. A permanently acting force is caused to act on the gripper in one direction or the other through the pin 66.

In the form of the invention shown in Figure 12, the gripper 71 is in the form of a crescent instead of a complete ring. In this case the oscillator 72 may be of the form illustrated and keyed to the shaft 73. A clearance is provided between the gripper 71 and the rotor 74 towards the horns of the crescent; the centres are as shown at Figure 10. This form of the invention may be arranged to drive in either direction as in the previous cases by exerting a force in one direction or the other on the gripper by means of springs or other means as shown by the dotted and full lines. In this case the rollers can also circulate around their track and the operation will be similar to that described with reference to the previous forms.

In the form of the invention shown in Figure 13, two eccentrics are employed. The oscillator $c$ is surrounded by a row of rollers 92 around which is placed a second eccentric 93 surrounded by a second row of rollers 94. The gripper $b$ immediately surrounds this outer set of rollers and fits easily within the rotor $a$. In this case no clearance is required owing to the use of the two eccentrics. The pressure points for forward and reverse drive are shown at A and B respectively. The point $o$ is the centre of oscillation of the eccentric and the inner track of the rotor. The point $o_1$ is the centre of the inner row of rollers and the point $o_2$ the centre of the outer row of rollers.

It should be noted that in this case there is no need of more than a working clearance, as the triangle $o o_1 o_2$ is obtained by the use of two eccentrics.

Figure 14 shows a modified form of the apparatus in which the outer circle of the gripper $b$ is not concentric with the rotor when in the neutral position. By arranging the gripper in this manner, it is possible to obtain a stronger gripper than is the case where the circle of the gripper is concentric with the rotor in the mean position.

Figure 15 shows diagrammatically another method of obtaining elasticity in a bearing. In this case there are inserted between the oscillator 131 and the gripper 132 a number of curved bars 133 of hard steel or phosphor-bronze or like material. The dimensions of these bars should be such that the elasticity limit is not exceeded under the pressure which is produced between the oscillator and the gripper.

A modification somewhat similar is shown at Figure 16. In this case the bar 134 which may be continued or not, as desired, is of corrugated form, the give required to allow virtual motion being provided for by the flattening of the corrugated bar. The resistance to squeezing out of oil with devices as shown in Figures 15 and 16, is very considerable, so that the friction between the oscillator and the gripper is very much less than that between the gripper and the rotor with a consequence that during the gripping period, there is a slight motion between the oscillator and the gripper, while the gripper and the rotor move together.

The gripper has a movement relative to the oscillator during the driving period, the possibility of this movement being due to the give allowed by the elasticity of the balls, rollers, or pads as shown in Figures 15 and 16. The movement of the gripper during the driving period depends on its inertia and also on the external forces, spring or other means by which it is pulled in the direction contrary to the direction of rotation. If the external force, therefore, acting on the gripper be varied, the travel of the gripper and therefore the period of gripping may be varied and also the mean position of the slider during motion may be altered as desired. The effect of varying the external force either by altering its direction or limiting its range of action is that the variations are produced proportionately on a very much larger scale on the torque of the secondary.

In apparatus constructed as above described a variable torque can be obtained from a constant speed engine owing to the elasticity of the parts.

In a device driven by mechanical valves as above described, if the resisting torque increases, the speed of the driven shaft automatically decreases.

I claim:—

1. Unidirectional reversing driving gear comprising in combination a shaft, an externally driven oscillating member and a gripper, both surrounding the shaft, an eccentric on the part of the oscillating member adjacent to the gripper, a rotor member keyed to the shaft, elastic bodies interposed between the eccentric and the gripper and between the oscillating member and the rotor member, which elastic bodies are compressed at the commencement of the driving stroke of the oscillating member and adjustable means for restraining the motion of the gripper in one direction or the other, thus varying the initial point of contact of the gripper and the rotor member and providing for reversal.

2. Unidirectional reversing driving gear comprising in combination a shaft, a gripper and an externally driven oscillating member, both surrounding the shaft, and oscillating member having an eccentric part situated within the gripper, a rotor member keyed to the shaft and surrounding the gripper, elastic ball bearings interposed between the eccentric part of the oscillating member and the gripper and between the oscillating member and the rotor member bearings, which are compressed at the commencement of the driving stroke of the oscillating member, and an adjustable spring for restraining the motion of the gripper in one direction or the other, thus varying the initial point of contact of the gripper and the rotor member and providing for reversal.

3. Mechanism for communicating motion from a shaft rotating at constant speed to a driven shaft rotating at a speed varying with the torque which tends to oppose its motion, comprising in combination a constantly rotating power shaft, a pair of counter shafts connected to and oscillated by the said power shaft, a driven shaft and links and a pair of unidirectional driving devices operatively connecting the said counter shafts with the driven shaft, each of such devices comprising in combination an oscillating member surrounding the said driven shaft and actuated in opposite phase by links from the said counter shafts, an eccentric part on the said oscillating member, a gripper surrounding the said eccentric part, a rotor keyed to said driven shaft and surrounding the said oscillating member and the said gripper, elastic ball bearings interposed between the eccentric part of the oscillating member and the gripper and between the non-eccentric part of the oscillating member and the rotor, such bearings being subject to compression at each driving stroke of the oscillating member and a spring adjustably mounted so as to act upon the said gripper in either direction and so provide for varying the mean position of the gripper, the period or phase of grip and the direction of motion of the rotor.

In testimony whereof I affix my signature.

GEORGE CONSTANTINESCO.